H. BROOKE.
Machines for Molding Plastic Materials.

No. 151,352.  Patented May 26, 1874.

WITNESSES.  
Henry N. Miller  
C. L. Everek.

INVENTOR  
Homer Brooke  
By Alexander & Mason  
Attorneys.

AM. PHOTO-LITHOGRAPHIC Co. N.Y. (OSBORNE'S PROCESS.)

UNITED STATES PATENT OFFICE.

HOMER BROOKE, OF NEW YORK, N. Y.

IMPROVEMENT IN MACHINES FOR MOLDING PLASTIC MATERIALS.

Specification forming part of Letters Patent No. 151,352, dated May 26, 1874; application filed May 15, 1874.

*To all whom it may concern:*

Be it known that I, HOMER BROOKE, of New York, in the county of New York and in the State of New York, have invented certain new and useful Improvements in Process of Molding Plastic or Semi-Plastic Materials; and do hereby declare that the following is a full, clear, and exact description thereof, reference being had to the accompanying drawings, and to the letters of reference marked thereon, making a part of this specification.

The nature of my invention consists in a device for molding plastic or semi-plastic materials, such as glass and other substances; and consists of a direct-acting plunger, which is capable of being thrown out of its line of motion, and a base or bed containing the die underneath the plunger, which is movable around the plunger, for the purpose of forming cavities larger than the plunger itself, all as more fully hereinafter set forth.

In order to enable others skilled in the art to which my invention appertains to make and use the same, I will now proceed to describe my process, as well as an apparatus by which said process may be carried out, reference being had to the accompanying drawing, in which—

Figure 1:
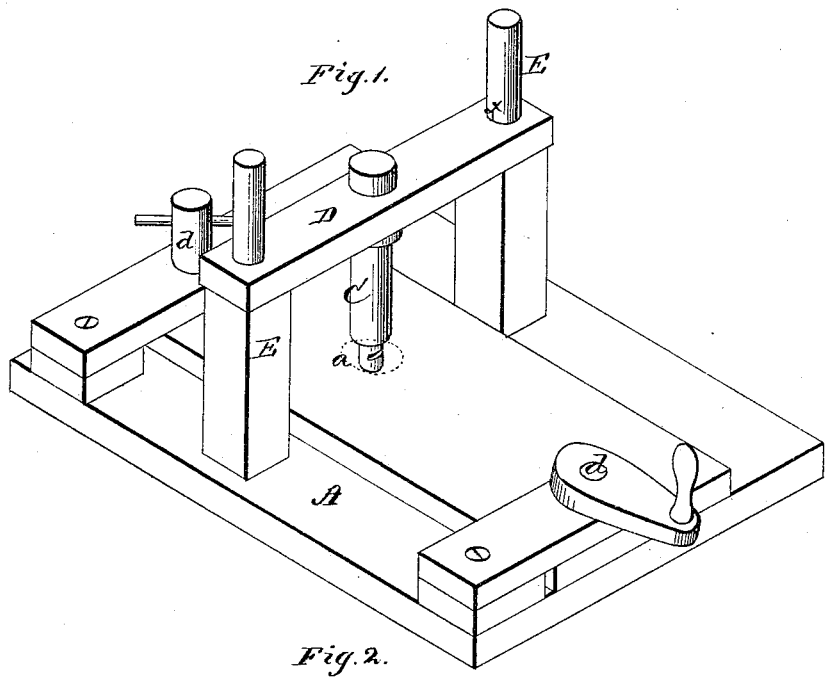
Figure 2:
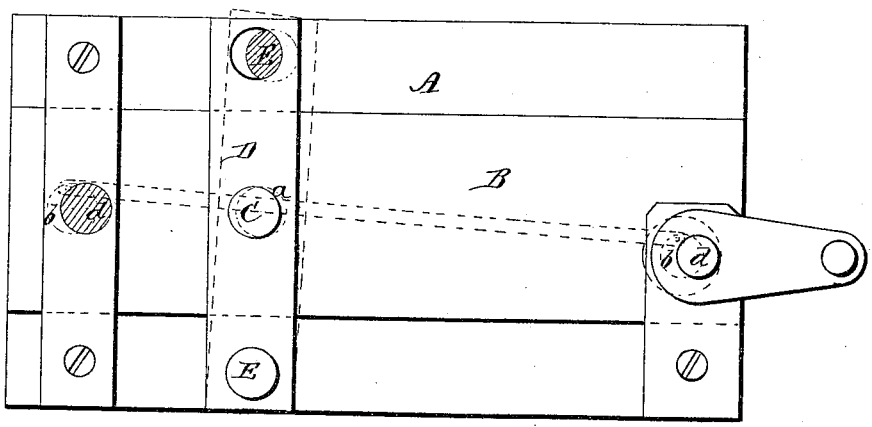

Figure 1 is a perspective view; and Fig. 2, a plan view, showing one form of an apparatus, by which my process may be carried out.

A represents the bed of the machine, upon which is a plate, B. In this plate, or upon the same, the die containing the plastic material is to be placed, at *a*, directly beneath a plunger, C, which is secured in a cross-head, D, moving upon vertical standards E E attached to the bed A. In each end of the plate B is placed an eccentric, *b*, secured upon a vertical shaft, *d*, which is to be revolved by a crank-lever or other suitable means. In one of the standards E, at the lowest point the cross-head D will reach, is a notch or slot, *x*, cut, so that the end of the cross-head can be thrown to one side after the plunger has entered the plastic material in the die beneath it.

The operation of this device is as follows: The die containing the plastic material being placed on or in the plate B at *a*, the cross-head D with the plunger C is moved downward by any mechanical means, letting the plunger enter the center of the die. One end of the cross-head D is then forced into the notch *x* on the standard, whereby the plunger is thrown to one side of the center in the die. If, now, both the shafts *d d* are revolved or turned one revolution, the plate B with the die will be moved on a circle around the stationary plunger, whereby the cavity or hole originally made by the plunger is enlarged. When the shafts *d d* have completed one or more revolutions they are stopped, and the cross-head D thrown out of the notch *x*, when the plunger may be withdrawn on a direct line from the die, leaving a cavity or hole molded in the plastic material larger than the plunger.

By this process any suitable devices may be molded in the cavity, such as letters, figures, &c. Corresponding indentations, grooves, or raised surfaces are to be made, in that case, on the plunger, and, when the plunger is inserted in the plastic material in the die the impressions are at once made in the plastic material, but the plunger could not be withdrawn without spoiling such impressions.

By my process, however, the cavity or hole is sufficiently enlarged to allow of the plunger being withdrawn without obliterating the impressions, but leaving them clear and distinct in the interior of the cavity. In precisely the same manner a cavity or chamber with perfectly smooth and parallel sides may be made.

By the arrangement of suitable mechanical devices the die may be moved so as to form an oval, square, rectangular, or other shaped cavity, just as well as a round; and, instead of moving the die and leaving the plunger stationary, the die may be left stationary and the plunger moved to accomplish the same result.

Hence I do not confine myself to the construction of any particular device for carrying out my process, except in so far that either the die or the plunger, or both, must be made movable, while the plunger remains in the plastic material in the die.

Having thus fully described my invention, what I claim as new, and desire to secure by Letters Patent, is—

The combination, in a device for molding cavities or holes in plastic material, of a direct-acting plunger, which is capable of being thrown out of the line of its motion, and a base or bed containing the die underneath said plunger, which is movable around the plunger, for the purpose of forming cavities larger than the plunger itself, substantially as herein set forth.

In testimony that I claim the foregoing, I have hereunto set my hand this 14th day o May, 1874.

HOMER BROOKE.

Witnesses:
  A. N. MARR,
  C. L. EVERT.